(12) United States Patent
Brunswig et al.

(10) Patent No.: US 7,917,524 B2
(45) Date of Patent: Mar. 29, 2011

(54) SYSTEMS AND METHODS FOR PROVIDING A MOCKUP DATA GENERATOR

(75) Inventors: Frank Brunswig, Heidelberg (DE); Pragnesh B. Mistry, Bangalore (IN); Prashanth Rai, Bangalore (IN); Abhay A. Tiple, Sandhausen (DE)

(73) Assignee: SAP AG, Walldorf (DE)

( * ) Notice: Subject to any disclaimer, the term of this patent is extended or adjusted under 35 U.S.C. 154(b) by 1161 days.

(21) Appl. No.: 11/475,059

(22) Filed: Jun. 27, 2006

(65) Prior Publication Data

US 2008/0010074 A1   Jan. 10, 2008

(51) Int. Cl.
G06F 7/00 (2006.01)
G06F 17/30 (2006.01)

(52) U.S. Cl. ........................... 707/757; 707/756
(58) Field of Classification Search .................. None
See application file for complete search history.

(56) References Cited

U.S. PATENT DOCUMENTS

| | | | |
|---|---|---|---|
| 5,652,835 A * | 7/1997 | Miller | 714/38 |
| 6,301,701 B1 * | 10/2001 | Walker et al. | 717/125 |
| 7,039,899 B1 * | 5/2006 | Quiroga | 717/115 |
| 7,272,822 B1 * | 9/2007 | Riggins et al. | 717/124 |
| 2002/0101920 A1 * | 8/2002 | Choi et al. | 375/240 |
| 2003/0217033 A1 * | 11/2003 | Sandler et al. | 707/1 |
| 2006/0005067 A1 * | 1/2006 | Llyod, Jr. | 714/4 |
| 2007/0033442 A1 * | 2/2007 | Tillmann et al. | 714/45 |
| 2007/0089091 A1 * | 4/2007 | Larab et al. | 717/124 |

OTHER PUBLICATIONS

Generating test data for distributed software using the chanining approach, Ferguson et al, Information and Software technonlogy 38 (1996) pp. 343-353.*
"Database Test Data Generation", IP.com Journal, May 19, 2003.
"Generation of test data for testing web services", IP.com Journal, Feb. 14, 2005.
Lin, P.J. et al., "Development of a Synthetic Data Set Generator for Building and Testing Information Discovery Systems", Proceedings of the Third International Conference on Information Technology: New Generations, pp. 707-712, Apr. 10, 2006.

* cited by examiner

*Primary Examiner* — Pierre M Vital
*Assistant Examiner* — Augustine Obisesan
(74) *Attorney, Agent, or Firm* — Mintz Levin Cohn Ferris Glovsky and Popeo, P.C.

(57) ABSTRACT

Methods and apparatus, including computer program products, are provided for mockup data for a mockup object. In one exemplary embodiment, the method may include receiving, from a user, a name of the mockup object for which the mockup data should be created, wherein the object comprises one or more nodes. The method may also include receiving, from the user, a number of records to be created for each node of the object, determining whether to modify existing mockup data or create new mockup data for each node, receiving, from the user, a beginning range and an ending range for the mockup data, and generating, within the framework, the mockup data for each node of the object based on metadata stored within the framework and the beginning and ending range.

20 Claims, 4 Drawing Sheets

SYSTEMS AND METHODS FOR PROVIDING A MOCKUP DATA GENERATOR

FIELD

The present invention generally relates to data processing. More particularly, the present invention relates to systems and methods for generating mockup data for mockup business objects.

BACKGROUND

There is, and will continue to be, advances and changes in how enterprises conduct business. Whether these advances and changes occur through growing competition and globalization, mergers and acquisitions, or a revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, represents a self-contained, self-describing piece of application functionality that can be found and accessed by other applications. A service is self-contained because the application using the service does not have to depend on anything other than the service itself, and self-describing because all the information on how to use the service can be obtained from the service itself. The descriptions are centrally stored and accessible through standard mechanisms.

Instead of requiring programmers to establish and maintain links between applications, services are loosely coupled, making connections simpler and more flexible, and allowing application architects to more easily find and understand services offered by other cooperative applications. However, the problem that exists with services is that they are often designed to expose functionality of individual applications and, thus, are too limited to be efficient building blocks for enterprise-wide business processes. A solution to this shortfall has been the migration to a Service Oriented Architecture (SOA). The SOA is an open architecture middleware, which builds on the benefits of services. An example of an SOA can be found in the Enterprise Service Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model).

The SOA enables the abstraction of business objects (BO), modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications, defined as applications that compose functionality and information from existing systems to support new business processes or scenarios.

The SOA also enables the use of an enterprise services repository. The enterprise services repository stores relevant pre-existing enterprise services and makes them available to selected partners and customers. By using the enterprise services repository, these selected partners and customers can use the pre-existing enterprise services to aid in the implementation of new services and corresponding business objects. The term "business object" (BO) represents a physical or logical object of significance to a business, such as a data structure including methods for generating a purchase order. An "object" refers to a software bundle of variables (e.g., data) and related methods. For example, in object-oriented programming, an object is a concrete realization (instance) of a class that consists of data and the operations associated with that data.

When services and business objects are developed, the development of other system components is delayed until the completion of the service and the corresponding business objects. Mockup business objects may be created in order to facilitate the development of other systems components. Often times, regression and mass data testing may need to be done on these services and business objects. These mockup business objects, however, need to be filled with data for regression testing and mass data tests prior to actual development of the business objects. As such, there is a need to improve development of mockup data for these mockup business objects.

SUMMARY OF THE INVENTION

The present invention provides methods and apparatus, including computer program products, for providing mockup data for mockup business objects.

In one exemplary embodiment, there is provided a method for creating mockup data for a mockup object, the mockup object implemented within a framework including other objects. The method may also include receiving, from the user, a number of records to be created for each node of the object, determining whether to modify existing mockup data or create new mockup data for each node, receiving, from the user, a beginning range and an ending range for the mockup data, and generating, within the framework, the mockup data for each node of the object based on metadata stored within the framework and the beginning and ending range.

It is to be understood that both the foregoing general description and the following detailed description are exemplary and explanatory only, and are not restrictive of the invention, as described. Further features and/or variations may be provided in addition to those set forth herein. For example, the present invention may be directed to various combinations and subcombinations of the disclosed features, and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1A:
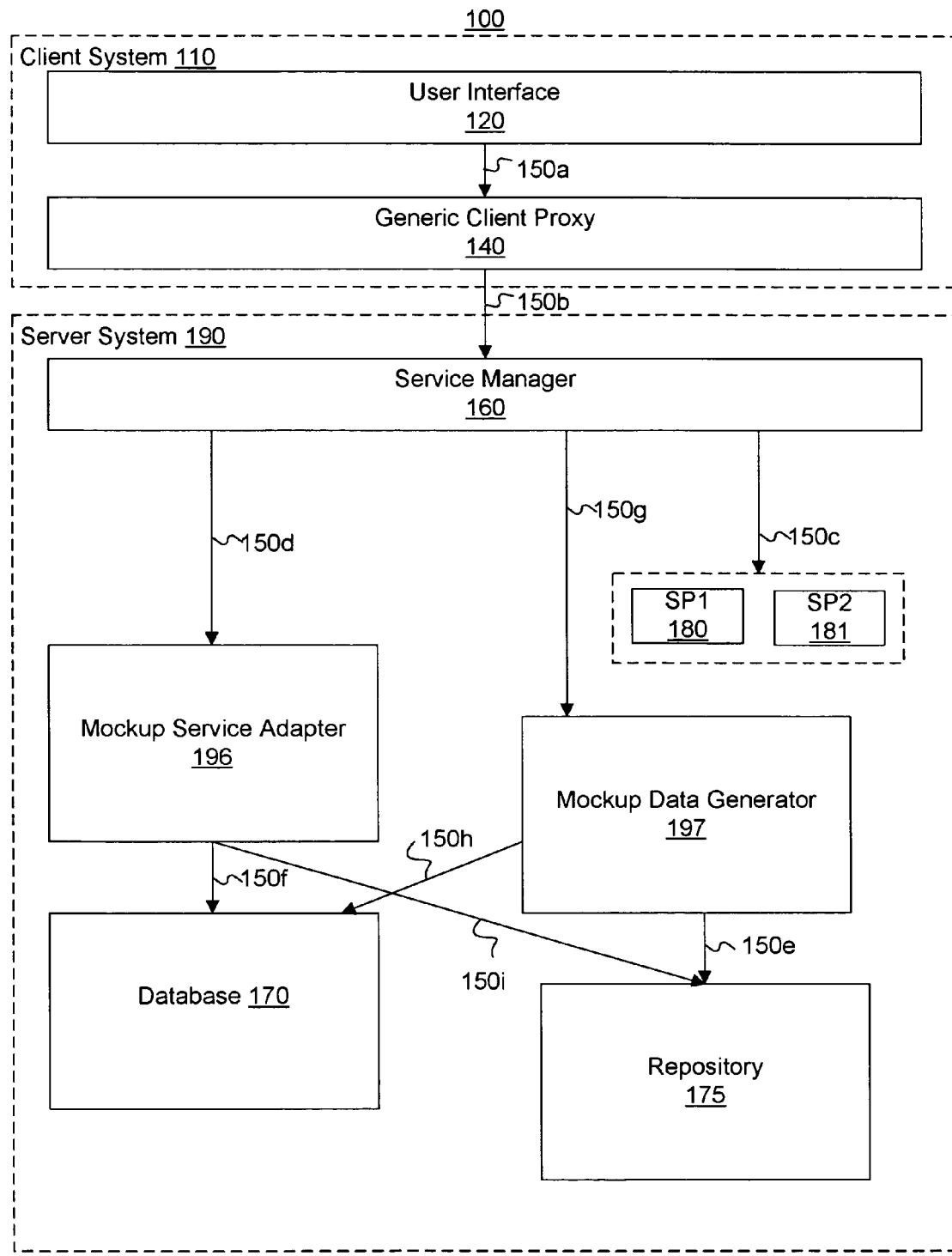
FIG. 1A illustrates a block diagram of an exemplary system environment consistent with certain aspects related to the present invention.

FIG. 1A is a block diagram of an exemplary system 100 environment that includes a client system 110 and a server system 190 for generating business objects. The business objects may serve as mockups that are stored in mockup storage for use at runtime. By providing a persistence framework for the mockup business objects, the mockup business objects can be used independently of the actual business objects, such as the business objects implemented when the development of system 100 is completed or finalized. As such, the mockup business objects that are generated allow development of components of system 100, such as the development of user interfaces, to proceed independently of, and in parallel to, the implementation of the actual business objects.

Referring to FIG. 1A, client system 110 includes a user interface (UI) 120 and a generic client proxy (GCP) 140. Client system 110 connects to server system 190 through network connection 150b. Server system 190 further includes a service manager (SM) 160, a repository 175, a mockup service adapter 196, a mockup data generator 197, a database 170, and service providers 180, 181. System 100 may be implemented as part of an enterprise services framework (ESF). An ESF is a type of computer framework, such as a client-server architectural framework, that includes one or more services. A framework is a system of software on one or more interconnected computers. The services are accessible to other parts of the ESF, such as client systems and their corresponding users, through a communication mechanism, such as the Internet or an Intranet. The ESF may be constructed using tools provided by SAP Netweaver™ (commercially available from SAP AG, Walldorf, Germany). Although FIG. 1A shows a single client system 110 and a single server system 190, a plurality of client systems and server systems may be used. Moreover, the components depicted in FIG. 1A may be distributed among multiple locations. Although FIG. 1A is described with respect to a client-server architecture and an ESF, system 100 can also use any other architecture or framework.

Client system 110 may include one or more processors, such as computers, to interface with server system 190. User interface 120 may provide an interface to allow a user to interact with other applications, such as service providers 180,181 and their corresponding business objects. User interface 120 may include a browser to provide content from service providers 180, 181. In some implementations, SAP Web Dynpro (commercially available from SAP AG, Walldorf, Germany) is used as a model-based development environment for generating user interface 120, although other development environments can also be used. User interface 120 may call the application program interface (API) of generic client proxy 140 through network connection 150a to interact, for example, with one of the service providers 180, 181.

Generic client proxy 140 may have an API implemented at client system 110 that is accessible to user interface 120. When instantiated, generic client proxy 140 may provide an interface, such as a Remote Procedure Call (RPC) or Simple Object Access Protocol (SOAP) interface, to service manager 160 at server system 190 through network connection 150b. Generic client proxy 140 may be implemented to control the functionality available to user interface 120 by providing a well-defined interface to service manager 160. For example, service manager 160 may include a variety of procedures, but generic client proxy 140 may be allowed access only to a subset of those procedures. Moreover, generic client proxy 140 may buffer requests and/or responses between user interface 120 and service manager 160.

Network connections 150a-150i may include, alone or in any suitable combination, a telephony-based network, a local area network (LAN), a wide area network (WAN), a dedicated Intranet, wireless LAN, the Internet, an Intranet, a wireless network, a bus, or any other communication mechanisms. Further, any suitable combination of wired and/or wireless components and systems may provide network connections 150a-150g. Moreover, network connections 150a-150g may be embodied using bidirectional, unidirectional, or dedicated communication links. Network connections 150a-150g may also implement standard transmission protocols, such as Transmission Control Protocol/Internet Protocol (TCP/IP), Hyper Text Transfer Protocol (HTTP), SOAP, RPC, or other protocols.

Server system 190 may include one or more processors, such as computers, to interface with other computers, such as client system 110. Generic client proxy 140 calls the API of service manager 160 at server system 190. When the API of service manager 160 is called, an instance of the service manager 160 is created at server system 190. Although service manager 160 is depicted within server system 190, service manager 160 can be located anywhere and distributed among multiple locations.

Repository 175 may store information associated with the business objects including metadata for the business objects, as well as the mockup data for the mockup business objects. For example, repository 175 may store a list of business object nodes including an identifier (ID) and mockup data content. The ID of a business object refers to an identifying memory address of a business object node that uniquely identifies individual business object nodes within repository 175. The memory address can be used to access and read data content of a particular business object node. For example, an ID of a business object node may consist of a directory structure and filename associated with the business object node. Repository 175 may be implemented as an enterprise services repository, although any other computer-readable storage medium may be used.

Repository 175 may also store metadata regarding one or more business objects. Metadata may be defined as data about data. For example, metadata may refer to information about the data itself, such as content, quality, condition, origin, size, formatting, characteristics of data, and the like. The eXtensible Markup Language (XML) is a specific example of metadata because it is a format used to define other data objects. Metadata may include a schema. A schema is the organization or structure, such as the organization of a database or the structure of an object in an object-oriented program. In object-oriented programming, modeling (i.e., the analysis of objects that are used in a business or other context and the identification of the relationships among these data objects) leads to a schema, which can be stored in repository 175 as a schema. The schema can be depicted visually as a structure or a formal text-oriented description (e.g., script). For example, metadata may be in the form of database tables. The metadata may include information, such as the number of nodes in a business object, the name(s) of the nodes, the position of a node in the business object hierarchy, the structure of a node, associations, actions, and default queries on a node.

Repository 175 may also store the mockup data associated with the mockup business objects. The mockup data is generated by the mockup data generator 197, as described further below.

Figure 1B:
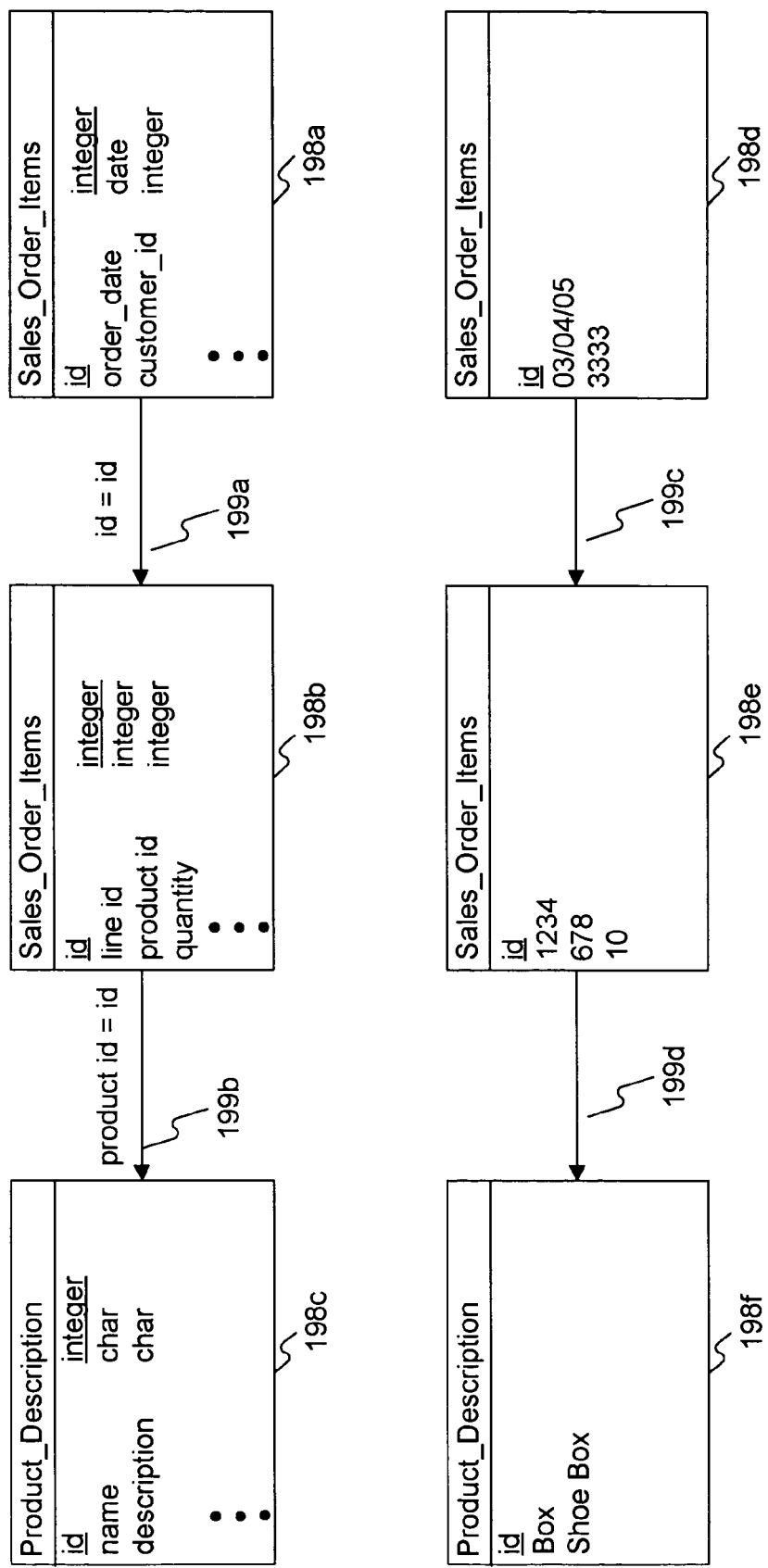
FIG. 1B illustrates an exemplary schema consistent with certain aspects related to the present invention.

FIG. 1B depicts an example schema for business object nodes containing mockup data stored at repository 175. The schema includes a business object node for a sales order 198a, sales order items 198b included with sales order items 198a, and the corresponding product description 198c. FIG. 1B also depicts the business object nodes with generated mockup data as shown in parent node sales order items 198d, child node sales order items 198e, and child node product description 198f. The mockup data in these mockup data business objects was generated by mockup data generator 197, as described further below. Moreover, the schema depicted in FIG. 1B may include keys 199a-d that identify the relationships among the business object nodes 198. For example, key 199a is a sales order identification value ("id") that is used to link business object nodes 198a and 198b. Key 199b links the product identification values (labeled at FIG. 1B as "product id") of sales order items 198b to the product identification value (labeled "id") of product description 198c. The schema, which depicts business object nodes and how they are associated to one another, may be considered metadata and stored in repository 175. Moreover, the schema may be considered a "model" of how to implement these business object nodes. The model may serve as a template to enable the composition of other models for business objects and their nodes. The models may also be used to generate script for generating code for the business objects and their nodes. The schema may be stored as metadata in repository 175. During the final implementation of system 100, a user would interact with a service, such as a Web service or service providers 180 or 181 provider (e.g., to receive a product catalog) to access the business objects stored at repository 175. The mockup data stored in the business objects may also be stored in repository 175.

Referring to FIG. 1A, mockup service adapter 196 may include an API, which when called generates mockup business objects using metadata. For example, the metadata stored in repository 175 may be used to generate mockup business objects. Mockup service adapter 196 stores any generated mockup business objects in mockup storage.

Figure 2:
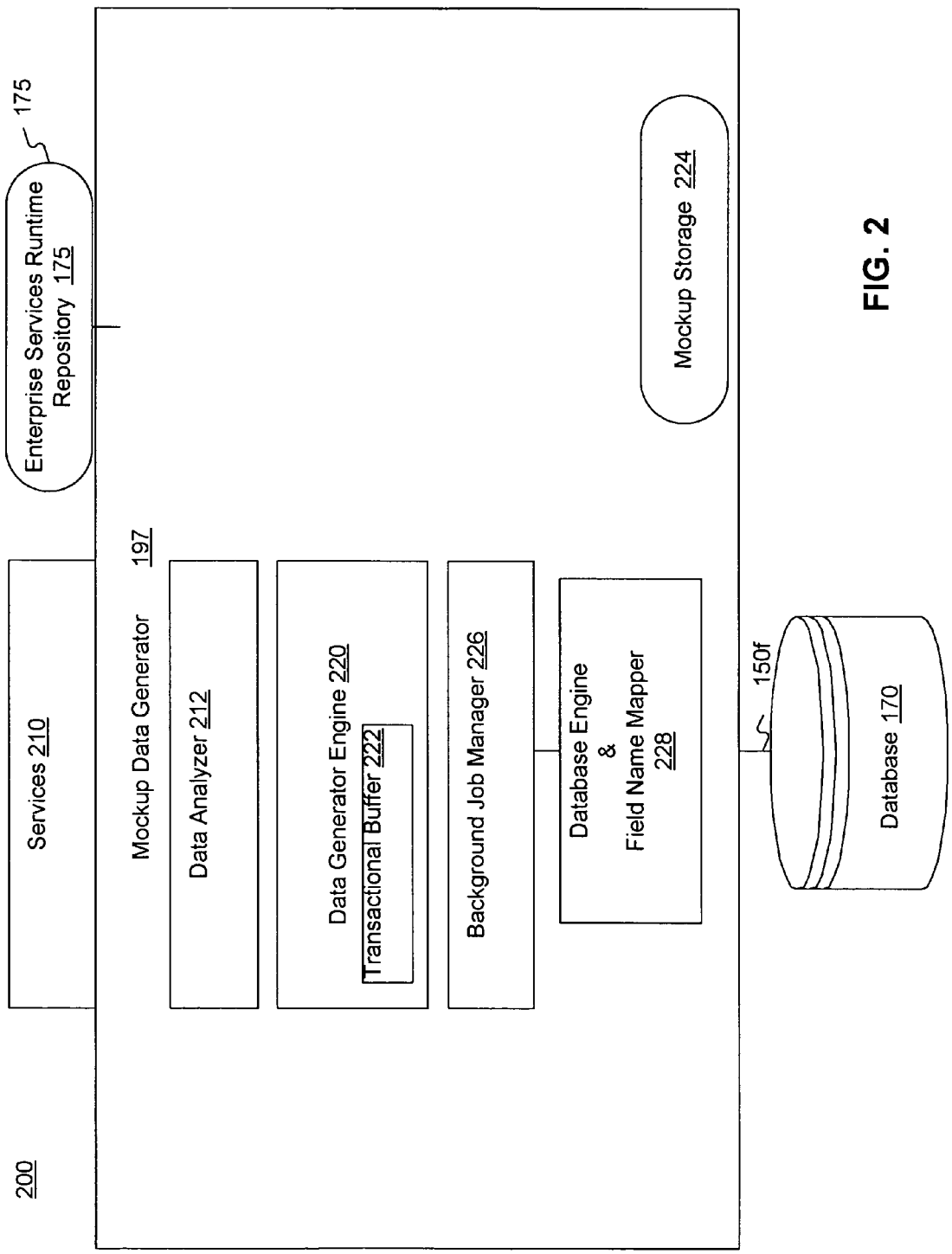
FIG. 2 illustrates a block diagram of an exemplary system at runtime consistent with certain aspects related to the present invention.

Mockup data generator 197 may include an API, which when called generates mockup data for the mockup business objects using user responses and metadata. For example, the metadata stored in repository 175 may be used to generate the mockup data. Specifically, if the schema of FIG. 1B depicts a model of an actual business object containing actual data, the model may be used to provide a similar model for generation of mockup data for mockup business objects. Mockup data generator 197 stores any generated mockup data in mockup storage 224 (as shown in FIG. 2). At runtime, the mockup business objects with the mockup data are used, such that development of components of system 100 may occur independently. For example, a user interface designer can develop user interface 120 to interact with a mockup business object containing the mockup data without regard to the actual business object data that might be used when system 100 is completed.

FIG. 2 depicts an exemplary mockup data generator 197. Mockup data generator 197 may generate, based on metadata stored in repository 175 and user responses, mockup data for the mockup business objects. Mockup data generator 197 may also store the mockup data in mockup storage 224.

Moreover, mockup data generator 197 may instantiate mockup data during runtime. The steps for generating the mockup data are described below with respect to FIG. 3. Referring to FIG. 2, when called by service manager 160, mockup data generator 197 calls a data analyzer 212.

Mockup data generator 197 comprises of data analyzer 212, data generator engine 220, and background job manager 226. Data analyzer 212 allows a user to specify a range of values for the creation of the mockup data. For example, a user may specify a value set for an integer field to start from "1" to "1000." Therefore, with reference to FIG. 1B, the user may specify that the data generated for "line id" in 198b must be an integer between "1" to "1000." Data analyzer 212 also allows the user to specify value sets using regular expressions. Data analyzer 212 also performs a check on the values specified by the user for a specified field to determine whether the field is valid. For example, for sales order items 198b, the "line id" must be an integer and the "product id" must also be an integer. The user may therefore only specify an integer range for the mockup data, for example, a range of "1" to "10,000." If the user specifies a character range, data analyzer 212 will determine that the field is not valid.

Data generator engine 220 may be called by mockup data generator 197 to generate mockup data for the mockup business objects. The mockup data is generated independently of any actual data. For example, based on the business object metadata stored in mockup storage 224, as well as the user input, generator engine 220 creates mockup data (e.g., the tables depicted in FIG. 1B) for the mockup business object nodes and stores the resulting mockup data in mockup business object nodes in mockup storage 224. The tables have technical names, such as "sales order," "sales order items," and "product description." Data generator engine 220 maps these technical names to an appropriate storage mechanism, such as mockup storage 224 or database 170. The association between mockup business object nodes, database table names, and field names (see, e.g., 198a at "id," "order date," and "customer id") may be stored in mockup storage 224.

A mockup business object node may have associated default queries on fields of a business object node. For example, each mockup business object node may have an associated database table (e.g., tables corresponding to nodes 198a-c) that includes fields and a default SQL query of those fields. Transactional buffer 222 may enable merging of database data and buffer data. For example, changes to mockup data in a mockup business object node may be stored in a buffer until a save is implemented to a database. When the save is called, any changes in the buffer are written to the database 170, such that the changes are entered in an ordered (or phased) manner. Transactional buffer 222 may also provide the parent-child and child-parent navigation through the mockup business object nodes. For example, a mockup business object model stored at mockup storage 224 may include a schema (see, e.g., FIG. 1B) that defines a parent node (e.g., node 198a) and child node (e.g., node 198b). The parent node may be a mockup business object node for generating a sales order, and one of the child nodes may be an object of the sales order (e.g., items contained within the order and product descriptions for the items). Transactional buffer 222 may thus provide navigation between those nodes 198. Although the mockup business object node is described in connection with a sales order business object, other types of objects may be used.

Transactional buffer 222 within data generator engine 220 manages transactional buffering, such as create, retrieve, update, and delete procedures performed on the mockup business object nodes of mockup storage 224. For example, service manager 160 may call various procedures from service providers 180, 181 to instantiate a mockup business object stored at mockup storage 224 to interact with and manipulate the mockup business object nodes. These procedures may include instructions to create, retrieve, update, and delete mockup business object nodes corresponding to service providers 180, 181. For example, a "create" procedure can be used to create a new mockup business object node, an "update" procedure to update data content in one or more mockup business object nodes, a "retrieve" procedure to retrieve mockup business object nodes, and a "delete" procedure to delete one or more mockup business object nodes. Moreover, procedures can be used in combination, such as a "query" procedure and a "retrieve" procedure, to search and retrieve data content from mockup business object nodes. When using the create, retrieve, update, and delete procedures, transactional buffer 222 may also implement additional procedures, such as check, save, and clean-up, as well as support change notifications to change handlers at service manager 160. Although transactional buffer 222 is described above as performing procedures, such as create, retrieve, update, and delete, on the mockup business objects, transactional buffer 222 may also perform the procedures on any objects.

Background job manager 226 may write all the mockup data that is stored in transactional buffer 222 to the database 170 or mockup storage 224. Background job manager 226 maintains any inconsistency in the database 170 if there is any failure during the write operation.

Database engine and field name mapper 228 may provide access to database 170 and provide any necessary mapping functionality between proxy names and database names. The proxy names of node fields (e.g., "product id" at node 198b in FIG. 1B) may represent the Advanced Business Application Programming (ABAP) name for the node fields in an ABAP dictionary generated at the time of proxy generation of the mockup business object. When database tables for the mockup business object nodes are created using metadata, it may not be practical to create the column names of the database table with exactly the same name as the proxy names. As such, database 170 may use "pseudo" names rather than the actual proxy names used by the mockup business object nodes. Database engine 228 may also include an API that limits access to database 170. For example, only database engine 228 may be aware of the actual pseudo field names used in database 170. All other components of system 200 may only know the proxy name, which is mapped by database engine 228 to the actual pseudo field name at database 170. Database engine 228 may also provide a default query procedure. For example, a mockup business object node may include a predefined query to serve as a default query. As such, the default query (defined by the mockup engine) would be any query defined on the mockup business object node (or its corresponding database table).

Moreover, when the API of service manager 160 is called by mockup service adapter 196, service manager 160 may instantiate one or more service providers 180, 181 and corresponding mockup business objects.

Mockup storage 224 provides storage of mockup business objects, mockup data for the mockup business objects, and their business object nodes (see, e.g., FIG. 1B). Mockup storage 224 may also include metadata. Although mockup storage 224 may be used to store all mockup data associated with the mockup business objects, the actual data associated with a mockup business object node may be stored in another location, such as database 170. Referring to FIG. 1B, the mockup business object nodes may correspond to nodes 198.

In this example, the data associated with the order date of node 198a may be stored at database 170. Mockup storage 224 may be implemented as a computer-readable storage medium (e.g., a disk drive, optical drive, and the like).

Figure 3:
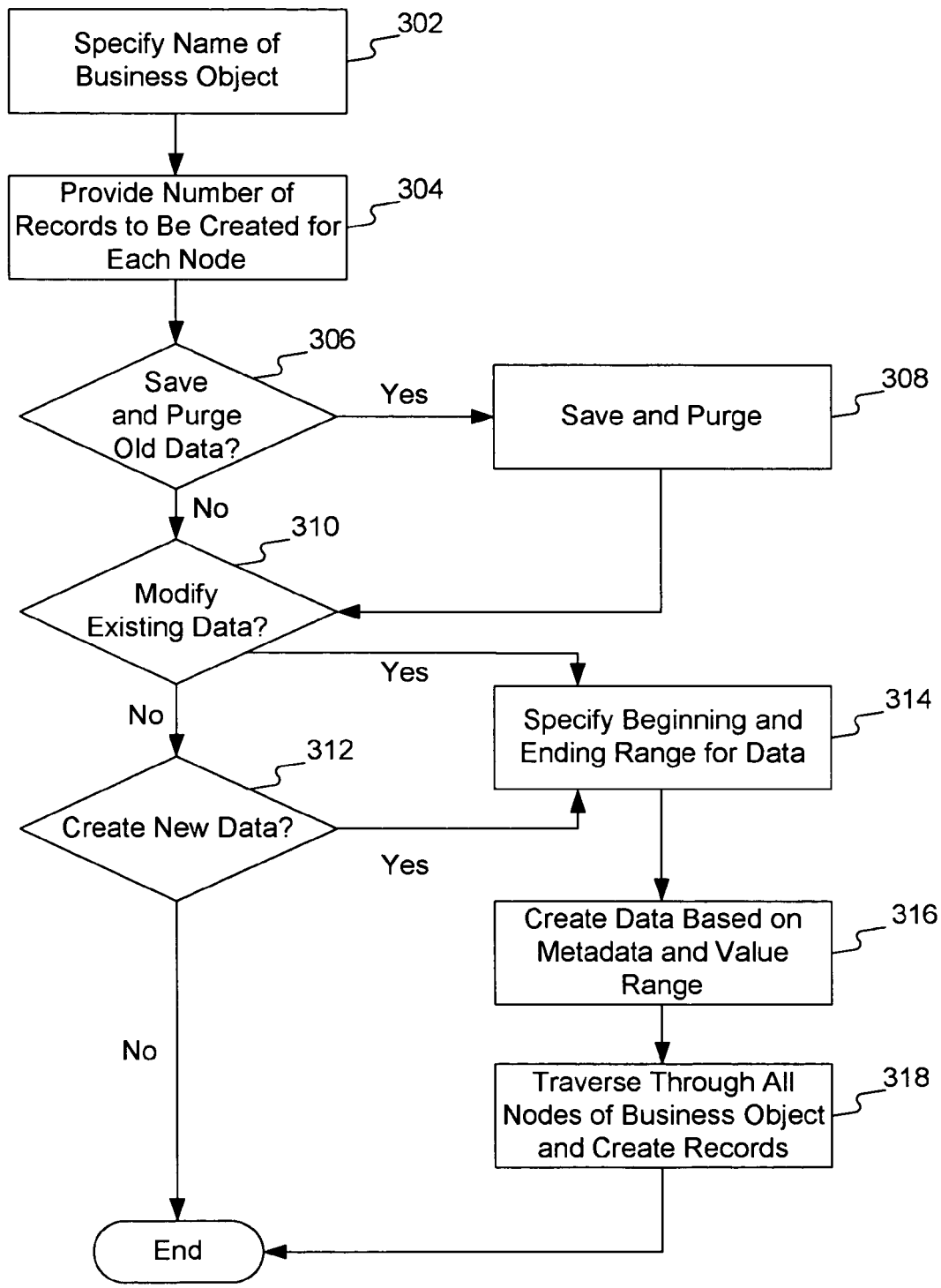
FIG. 3 illustrates a flow chart with exemplary steps for generating objects consistent with certain aspects related to the present invention.

FIG. 3 is a flowchart of exemplary steps for generating mockup data for the mockup business objects. Referring to FIGS. 2 and 3, when service manager 160 calls mockup data generator 197, the call may initiate step 302. Data analyzer 212 may first receive from a user the name of the business object for which to create mockup data (step 302). The user (e.g., a person on a computer) in this case would be specifying the name of the business object and the business object node for which the mockup (also referred to as "simulated data" or "dummy data") data needs to be filled.

The call to mockup data generator 197 initiates data analyzer 212 to determine whether the specified mockup business object exists before mockup data is created for that business object. For example, if the mockup business object requested by the call does not have any corresponding data stored at mockup storage 224, data analyzer 212 may determine that the business object does not exist.

The user may then provide the number of records to be created for each node of the business object (step 304). For example, if the user specifies the parent node 198a, the user would specify how many mockup sales order items 198a the mockup data generator 197 should create. The parent node may be a mockup business object node for generating a sales order, and one of the child nodes (e.g., 198b) may be an object of the sales order (e.g., items contained within the order and product descriptions for the items).

If data analyzer 212 determines that the business object is already associated with mockup data, the user may have the option of saving and purging the old data (step 306). If the user decides to purge the mockup data, then the mockup data in the specified business object is deleted and not saved (step 308). However, if the user decides to save the existing mockup data, data analyzer 212 may write the data to mockup storage 224. For example, if the user selects sales order items 198a, and the date of that node is set to "Mar. 4, 2005," the user may decide to purge this date and have the mockup data generator 197 create a new mockup date for this node. The user may also save the information in sales order items 198d to mockup storage 224.

The user may also be given a chance to modify the existing data (step 310). For example, if the user specifies the business object sales order times 198d, the user may change the order date or the customer id to be a different value than the value stored. If the user decides to modify the existing data, the user may first have to specify the beginning and ending range for the data (step 314). The range will be determined by the corresponding schema of the business object. For example, if the user is modifying the order date, then the range he must specify must correspond to a date range.

The user may decide not to modify any existing data (step 310) but instead create new data (step 312) for the selected business object. The user may again have to specify the beginning and ending range for the data as described above (step 314). Once the user has specified whether new data should be created or existing data should be modified, data generator engine 220 may then create the mockup data based on the metadata stored in repository 175 and the value ranges specified by the user (step 316). Data generator engine 220 may then traverse through each node of the specified business object and create a record in mockup storage 224 for each node (step 318). Data generator engine 220 automatically creates random mockup data for the mockup business objects.

In one embodiment, the user may specify the parent-to-child ratio for each mockup business object for data to be generated by the mockup data generator 197. Therefore, the user may specify that a specific parent node may have an "X" number of child nodes associated with it. For example, in the example of FIG. 1B, parent node 198d has two child nodes 198e and 198f associated with it. The user may have specified for the parent to have two child nodes. In another embodiment, the user is given a chance to modify the records once the parent-to-child ratio is chosen. Therefore if the user selects a parent-to-child ratio that is large, the user is able to see the number of records that will be created for that ratio. The user can modify this number to have the mockup data generator 197 either make more or less records for the specific node. In the same example, if the user had specified two child nodes per parent node, mockup data generator 197 may have alerted the user that seven records would be created for this business object. The user at this time could reduce the number of records if desired.

The systems and methods disclosed herein may be embodied in various forms, including, for example, a data processor, such as a computer that also includes a database, digital electronic circuitry, firmware, software, or any combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A method for creating mockup data for a mockup object, the mockup object implemented within a framework including other objects, the method comprising:
receiving, from a user, a name of the mockup object for which the mockup data should be created, wherein the object comprises one or more nodes generated based on metadata information stored within the framework, the metadata information including one or more of: number of the one or more nodes in the object, names of the one or more nodes, positions of the one or more nodes in the object's hierarchy, structures of the one or more nodes, associations of each of the one or more nodes with at least one other node in the one or more nodes, actions associated with the one or more nodes, and queries associated with the one or more nodes;
receiving, from the user, a number of records to be created for each node of the object; determining whether to modify existing mockup data or create new mockup data for each node;
receiving, from the user, a beginning and an ending range for the mockup data, the beginning and ending range being determined, at least in part, based on the metadata information corresponding to the received range; and
generating, within the framework, based on the metadata information and the beginning and ending range determined at least in part based on the corresponding metadata information, the mockup data to fill at least one of the one or more nodes of the object generated based on the metadata information;
wherein the generated object includes a specified number of child nodes associated with at least one parent node of the object defined by the metadata information, the specified number of child nodes being based on input received from the user;
and wherein at least one of the one or more nodes of the generated mockup object includes predetermined database queries to enable access of the mockup object to one or more databases.

2. The method of claim 1, further comprising:
allowing the user to save existing mockup data within each node of the object, wherein the object comprises a business object.

3. The method of claim 1, wherein determining further comprises:
allowing the user to purge the existing mockup data within each node of the object after the existing mockup data is saved.

4. The method of claim 1, further comprising:
creating a record of mockup data for each node of the object.

5. The method of claim 1, wherein determining further comprises:
prompting the user to determine whether the user wants new mockup data created or existing mockup data changed.

6. The method of claim 1, further comprising: displaying to the user a ratio of child nodes to parent nodes for the object;
displaying to the user the number of records that will be created for each node; and allowing the user to modify the number of records.

7. The method of claim 1, wherein the framework is a computer framework.

8. A system or creating mockup data for a mockup object, the mockup object implemented within a framework including other objects, the system comprising: a processor; and
a memory, wherein the processor and the memory are configured to perform a method comprising:
receiving, from a user, a name of the mockup object for which the mockup data should be created, wherein the object comprises one or more nodes generated based on metadata information stored within the framework, the metadata information including one or more of: number of the one or more nodes in the object, names of the one or more nodes, positions of the one or more nodes in the object's hierarchy, structures of the one or more nodes, associations of each of the one or more nodes with at least one other node in the one or more nodes, actions associated with the one or more nodes, and queries associated with the one or more nodes;

receiving, from the user, a number of records to be created for each node of the object; determining whether to modify existing mockup data or create new mockup data for each node;

receiving, from the user, a beginning and an ending range for the mockup data, the beginning and ending range being determined, at least in part, based on the metadata information corresponding to the received range; and generating, within the framework, based on the metadata information and the beginning and ending range determined at least in part based on the corresponding metadata information, the mockup data to fill at least one of the one or more nodes of the object generated based on the metadata information;

wherein the generated object includes a specified number of child nodes associated with at least one parent node of the object defined by the metadata information, the specified number of child nodes being based on input received from the user;

and wherein at least one of the one or more nodes of the generated mockup object includes predetermined database queries to enable access of the mockup object to one or more databases.

9. The system of claim 8, further comprising:
allowing the user to save existing mockup data within each node of the object, wherein the object comprises a business object.

10. The system of claim 8, wherein determining further comprises:
allowing the user to purge the existing mockup data within each node of the object after the existing mockup data is saved.

11. The system of claim 8, creating a record of mockup data for each node of the object.

12. The system of claim 8, wherein determining further comprises:
prompting the user to determine whether the user wants new mockup data created or existing mockup data changed.

13. The system of claim 8, further comprising:
displaying to the user a ratio of child nodes to parent nodes for the object;
displaying to the user the number of records that will be created for each node; and allowing the user to modify the number of records.

14. The system of claim 8, wherein the framework is a computer framework.

15. A computer-readable storage device containing instructions to configure a processor to perform a method for creating mockup data for a mockup object, the mockup object implemented within a framework including other objects, the method comprising:

receiving, from a user, a name of the mockup object for which the mockup data should be created, wherein the object comprises one or more nodes generated based on metadata information stored within the framework, the metadata information including one or more of: number of the one or more nodes in the object, names of the one or more nodes, positions of the one or more nodes in the object's hierarchy, structures of the one or more nodes, associations of each of the one or more nodes with at least one other node in the one or more nodes, actions associated with the one or more nodes, and queries associated with the one or more nodes;

receiving, from the user, a number of records to be created for each node of the object;

determining whether to modify existing mockup data or create new mockup data for each node;

receiving, from the user, a beginning and an ending range for the mockup data, the beginning and ending range being determined, at least in part, based on the metadata information corresponding to the received range;

generating, within the framework, based on the metadata information and the beginning and ending range determined at least in part based on the corresponding metadata information, the mockup data to fill at least one of the one or more nodes of the object generated based on the metadata information;

wherein the generated object includes a specified number of child nodes associated with at least one parent node of the object defined by the metadata information, the specified number of child nodes being based on input received from the user;

and wherein at least one of the one or more nodes of the generated mockup object includes predetermined database queries to enable access of the mockup object to one or more databases.

16. The computer-readable medium of claim 15, further comprising:
allowing the user to save existing mockup data within each node of the object, wherein the object comprises a business object.

17. The computer-readable medium of claim 15, wherein determining further comprises:
allowing the user to purge the existing mockup data within each node of the object after the existing mockup data is saved.

18. The computer-readable medium of claim 15, further comprising: creating a record of mockup data for each node of the object.

19. The computer-readable medium of claim 15, wherein determining further comprises:
prompting the user to determine whether the user wants new mockup data created or existing mockup data changed.

20. The computer-readable medium of claim 15, further comprising: displaying to the user a ratio of child nodes to parent nodes for the object; displaying to the user the number of records that will be created for each node; and allowing the user to modify the number of records.

* * * * *